United States Patent [19]

Susini et al.

[11] Patent Number: 4,909,425
[45] Date of Patent: Mar. 20, 1990

[54] GUIDING DEVICE FOR FOLDED FILM

[75] Inventors: Etienne Susini, Villecresnes, France; Pierre Soubrier, Brussels, Belgium

[73] Assignee: Baxter International Inc., Deerfield, Ill.

[21] Appl. No.: 155,929

[22] PCT Filed: May 20, 1987

[86] PCT No.: PCT/FR87/00172

§ 371 Date: Mar. 2, 1988

§ 102(e) Date: Mar. 2, 1988

[87] PCT Pub. No.: WO87/07244

PCT Pub. Date: Dec. 3, 1987

[30] Foreign Application Priority Data

May 21, 1986 [FR] France .................. 86 07208

[51] Int. Cl.$^4$ .............. B65H 23/10; B65H 23/02; B65H 23/04
[52] U.S. Cl. ....................... 226/17; 156/466; 226/15; 226/180
[58] Field of Search ............... 226/15-23, 226/180, 187; 156/459, 465, 466, 502, 504, 510

[56] References Cited

U.S. PATENT DOCUMENTS

| | | |
|---|---|---|
| 2,467,879 | 4/1949 | Billeb . |
| 3,147,898 | 9/1964 | Huck ................... 226/17 |
| 3,322,604 | 5/1967 | Schott . |
| 3,334,466 | 8/1967 | Scholle . |
| 3,545,166 | 12/1970 | Johnson et al. . |
| 3,553,934 | 1/1971 | Johnson et al. . |
| 3,587,958 | 6/1971 | Taylor ................... 226/17 |
| 3,709,418 | 1/1973 | Sylvester et al. ........... 226/17 |
| 3,729,359 | 4/1973 | Monsees ............... 156/466 |
| 3,754,064 | 8/1973 | Snelling . |
| 3,775,225 | 11/1973 | Schott ................ 156/510 |
| 3,884,131 | 5/1975 | Palsson . |
| 4,007,865 | 2/1977 | Crandall ................ 226/17 |
| 4,103,473 | 8/1978 | Bast et al. . |
| 4,117,647 | 10/1978 | Rossi . |
| 4,303,189 | 12/1981 | Wiley et al. ........... 226/15 |
| 4,517,789 | 5/1985 | Ash . |

FOREIGN PATENT DOCUMENTS

| | | |
|---|---|---|
| 517892 | 2/1931 | Fed. Rep. of Germany . |
| 1944633 | 3/1971 | Fed. Rep. of Germany . |
| 1774177 | 10/1971 | Fed. Rep. of Germany . |
| 2213547 | 9/1973 | Fed. Rep. of Germany . |
| 2254372 | 2/1976 | Fed. Rep. of Germany . |
| 680497 | 5/1930 | France . |
| 2136840 | 12/1972 | France . |
| 2264310 | 10/1975 | France . |
| 60-4452 | 1/1985 | Japan . |
| 1238937 | 7/1971 | United Kingdom . |

OTHER PUBLICATIONS

IBM Technical Disclosure, vol. 22, No. 6; Paper Feed Mechanism; J. S. Heath; Nov. 1979.

Primary Examiner—John Petrakes
Attorney, Agent, or Firm—Paul E. Schaafsma; Robert M. Barrett; Paul C. Flattery

[57] ABSTRACT

A device for guiding a web of flexible film that has been folded back upon itself so as to maintain the edges of the web of film precisely positioned for subsequent sealing. The device includes a smooth support plate positioned so as to be received between two folds of the web of film with pressure being applied to hold the folds against the plate by means of rollers. The rollers are mounted to maintain the folds against the support plate and to assume different orientations relative to the direction of movement of the web.

19 Claims, 2 Drawing Sheets

GUIDING DEVICE FOR FOLDED FILM

BACKGROUND OF THE INVENTION

The present invention relates to a device for guiding a web of flexible film that has been folded back on itself, particularly, although not exclusively so, for use in an apparatus for manufacturing pouches or bags containing a perfusion liquid.

There are known machines for the manufacture of pouches or bags from flexible plastic film. Specifically, there are known machines for the manufacture of pouches or bags from a thermoplastic film. These machines include a series of stations at which the film is treated in succession. Generally, the film is unwound from a winder, then perforated. Perpendicular to the perforations, ports or fitments are sealed by a welding head. The film is then shaped in a film-shaping device. The film-shaped device is designed to fold the film back on itself, for the purpose of creating an edge to edge seal. Once sealed edge to edge, the film forms a tube that is then sealed in a transverse direction, at regular intervals, in order to form individual pouches or bags. Those pouches or bags then are filled prior to the creation of a second transverse seal that forms the pouch or bag.

The present invention more particularly relates to the step of the process that immediately precedes the creation of the edge to edge seal. When the film is folded back on itself as it passes through the shaping device, the two edges of the film may not be precisely juxtaposited. If the shift between the edges is too great, the edges are not sealed together when they pass through the sealing device.

SUMMARY OF THE INVENTION

The present invention provides a guiding device that causes the edges of the film to coincide more accurately immediately prior to the sealing operation.

To this end, the present invention provides a guiding device for a flexible film folded back on itself and driven into motion in a longitudinal direction of the film. This device includes a smooth support plate affixed to the frame, mounted in a direction parallel to the film and positioned so as to be received between two folds of the film, and pressure means carried by the frame on each side of the support plate to hold the folds of the film against the support plate. The pressure means are mounted so as to assume different orientations relative to the direction of movement of the film.

Thus, during the longitudinal movement of the film, the pressure means induces a transverse movement component that becomes more important as the slant of the pressure means increases relative to the direction of movement of the an adjustment of the orientation of the pressure means permits one to obtain the lateral movement component required for the edges of the film to be precisely juxtaposited at the exit of the guiding device.

In a preferred embodiment of the invention, the guiding device includes means for blocking the orientation of the pressure means. Thus, for a given film having constant slip characteristics, the initial adjustment of the guiding device is maintained by blocking the orientation of the pressure means in a position that permits a juxtaposition of the two edges of the film.

According to a preferred embodiment of the invention, the pressure means includes a small wheel or roller mounted on a rotating shaft parallel to the support plate. In that way the pressure means exerts a minimal amount of friction on the film and therefore will not damage it.

In another embodiment of the invention, the small wheel or roller is mounted on a movable roller support in a direction transverse to the support plate. The roller support is urged toward the support plate by elastic means, specifically by a helix-shaped spring. In that way, the pressure of the support means on the film is maintained constant and it is adapted to the characteristics of the film being treated by acting on the elastic means.

In another embodiment of the present invention, the guiding device includes a film lug member which extends in a direction transverse to the support plate, on each side of the latter. Thus, when the edges of the film are supported against the lug member, the reaction on the lug member compensates for the transverse displacement component. It is therefore assured that the edges of the film are precisely juxtaposited at the exit of the guiding device.

Other features and advantages of the invention will be apparent upon a review of the detailed description of the presently preferred embodiments and the drawings.

DETAILED DESCRIPTION OF THE PRESENTLY PREFERRED EMBODIMENTS

Figure 1:
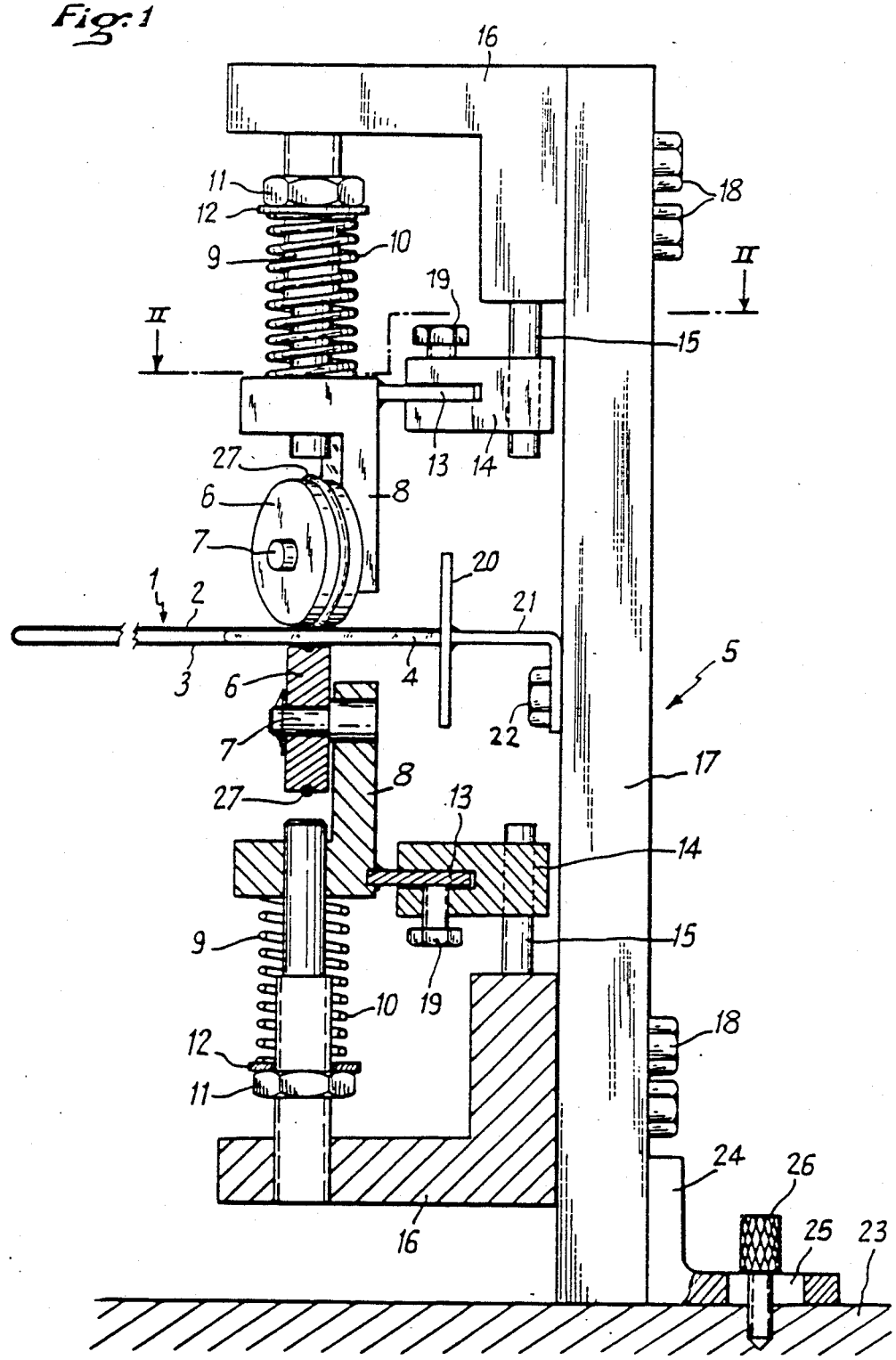
FIG. 1 is a top view, in partial section, of the device according to the present invention.

Referring to the Figures, as illustrated at the end of the "putting edge to edge" step, the film generally extends in a vertical direction and therefore moves in a direction perpendicular to the plane of FIG. 1.

During its passage through the guiding device the flexible film 1, for example a film of thermoplastic material, has already been folded back on itself in a shaping device and possibly fitted with ports or fitments. The film therefore has two folds 2 and 3 that face each other. At the exit of the shaping device, the edges of the folds 2 and 3 generally are approximately juxtaposited. As indicated above, however, it is desirable to improve the precision of that alignment prior to the edge to edge sealing operation. To this end, the device according to the invention includes a smooth support plate 4 affixed to a chassis designated in its general shape by the numeral 5. The support plate 4 is mounted in a direction parallel to the film 1 and it is positioned to be received between the folds 2 and 3 of the film. The guiding device further includes pressure means formed by small wheels or rollers 6, positioned on each side of the support plate 4. The small wheels or rollers 6 are each rotatably mounted on a rotation shaft 7 parallel to the support plate 4. The rotation shafts 7 themselves are fixed on small wheel supports 8 mounted so as to slide and to pivot on pivoting shafts 9 perpendicular to the support plate 4, so that the wheel supports 8 are movable in a direction transverse toi support plate 4. The small wheel supports 8 are urged toward the support plate 4 by elastic means formed by helix-shaped springs 10 mounted around the pivoting shaft 9. The degree of compression of the helix-shaped springs can be adjusted by means of screwnuts 11 mounted on the threaded base of the pivoting shafts 9 and that act on the spring 10 through washers 12.

The pressure means are thus positioned to maintain the folds of the film 1 against the support plate 4 and to assume different orientations relative to the direction of movement E of the film 1.

In the illustrated embodiment, the guiding device includes means for blocking the orientation of the pressure means. Those blocking means include circular sectors 13 affixed to the small wheel supports 8, in a direction perpendicular to the pivoting shaft 9, and means to connect the sectors 13 to the frame 5. The connection means is formed by a connection member 14, mounted so as to slide on small columns 15 carried by squares 16. The squares 16 themselves are fixed to a base plate 17 of the frame 5, by means of bolts 18. The connection parts 14 comprise a slit into which is received the corresponding sector 13 the position of which, relative to the connection member 14 is held fast by a blocking bolt 19, screwed in the connection member 14 and that takes its support on a face of a sector 13.

In addition, the device includes a film lug piece 20 that extends in a position transverse to the support plate 4, on each side of the plate. In the embodiment illustrated, the film lug piece 20 is welded in a direction perpendicular to the support plate 4 that includes a flange 21 which is received within an opening (not illustrated) in lug piece 20. The flange 21 of the support plate is folded back and affixed to the base plate 17 of the frame 5 by a bolt 22.

The base plate 17 of the frame 5 is connected to a frame 23 by a square 24. One arm of the square 24 is affixed, by welding for example, to the base plate 17 and the other arm of the square 24 has openings 25 which receive bolts 26 screwed into the frame 23 the heads of which are supported on the square 24, on each side of the openings 25. The square 24 and the bolts 26 thus form means for adjusting the position of the frame in a direction perpendicular to the direction of movement of film 1. It is therefore easy to adapt the device to different widths of the film.

Figure 2:
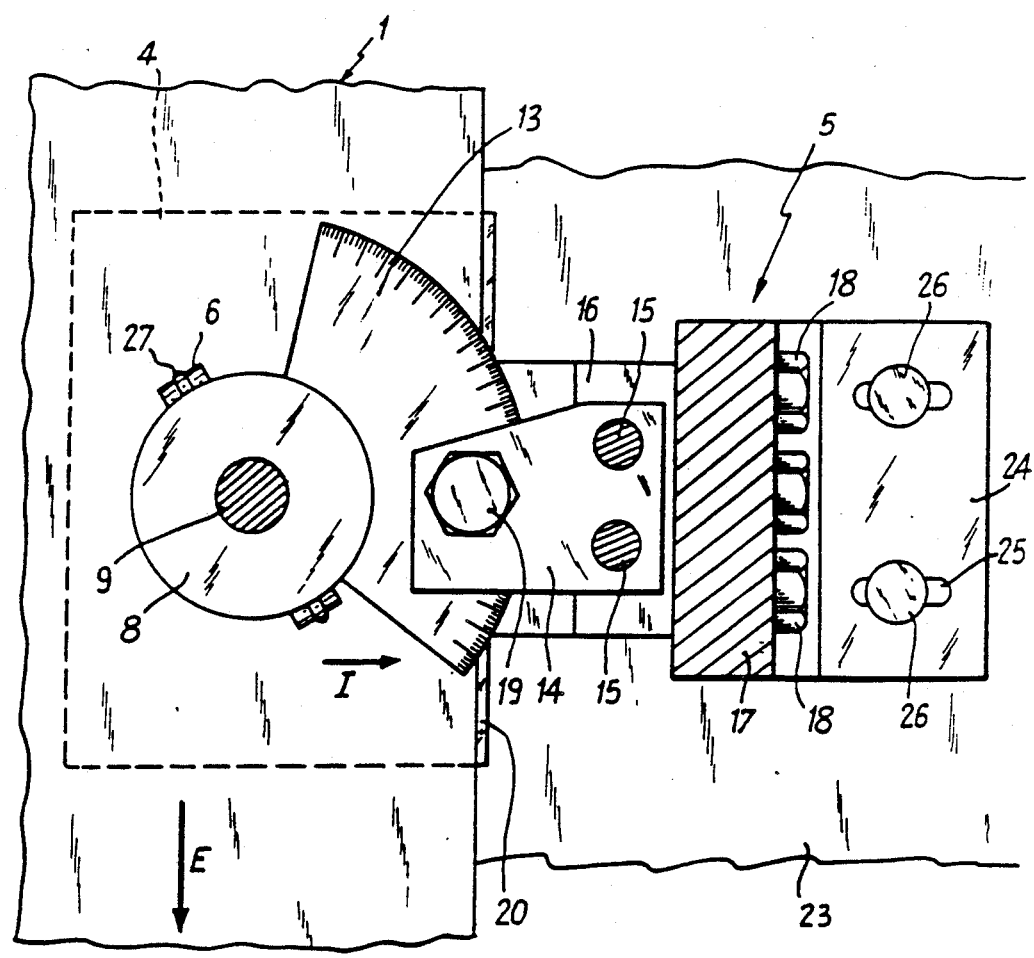
FIG. 2 is a side section view taken along line II—II of FIG. 1.

The device of the present invention functions as follows: each one of the film holds 1 is received between one face of the support plate and the small wheel or roller 6 that is facing it. The film is then driven along in a direction E illustrated in FIG. 2. If it is noted that at the exit of the guiding device the edges of the two folds are not suitably aligned, the orientation of the small wheels or rollers 6 is modified by unblocking bolts 19 and causing the small wheel supports 8 to rotate around their pivoting shaft 9. When the desired edge to edge alignment has been achieved at the exit of the guiding device, the orientation of the small wheels 6 is fixed by again blocking the bolts 19.

It will be noted that during the driving of film 1, the film moves relative to the small wheels 6 in a rolling motion with sliding that induces a lateral component of the movement on each one of the folds of film 1. The sliding coefficient is determined by three factors which are the orientation of the small wheel relative to the direction of movement of film 1, the force urging the small wheels or rollers 6 toward the support plate 4 which, in the embodiment illustrated, can be adjusted by acting on screwnuts 11, and the friction coefficient of the small wheels or rollers 6 which may be adjusted by providing on the small wheels or rollers a movable peripheral reed 27.

It should be understood that the invention is not limited to the presently preferred embodiment which has been described, and that variations can be made without departing from the scope of the present invention. Specifically, it is possible to replace the small wheels or rollers 6 by different pressure means, such as flexible blades, that induce a lateral component on the folds of the film, without preventing the displacement of the film in the driving direction.

In addition, it is possible to permanently adjust the orientation of the pressure means by connecting, for example, the small wheel supports 8 to small electric motors remotely driven, or subjected to a detecting device positioned downstream from the guiding device.

We claim:

1. A device for guiding a web of flexible film folded back on itself and driven into displacement in a longitudinal direction of the film comprising a frame, a smooth support plate affixed to the frame and positioned to be received between two folds of the web of film, and at least one roller carried by the frame on each side of the support plate, the rollers being mounted to maintain the folds of the film against the support plate and to assume different orientations relative to the direction of movement of the film.

2. The guiding device of claim 1 including means for limiting the orientation of the rollers.

3. The guiding device of claim 2 wherein the means for limiting the orientation of the rollers includes a sector fixed to the rollers in a direction transverse to the pivoting shaft and connection means between the sector and the frame.

4. The guiding device of claim 1 wherein the rollers include a movable peripheral reed.

5. The guiding device of claim 1 wherein the rollers are mounted on a support, movable in a direction transverse to the support plate, the support being urged back toward the support plate by elastic means.

6. The guiding device of claim 5 wherein the elastic means includes a helix-shaped spring.

7. The guiding device of claim 1 including orientation means for orienting the rollers including a pivoting shaft that extends in a direction transverse to the support plate and the rollers are pivotally mounted in that shaft.

8. The guiding device of claim 1 including a film lug piece that extends in a direction transverse to the support plate on each side of the plate.

9. The guiding device of claim 1 wherein the frame includes means for adjusting the position of the frame in a direction transverse to the direction of movement of the film.

10. An apparatus for guiding a folded web of film that is fed through a packaging machine comprising:
   a support plate for being received between folds of the web of film as the web of film is fed through a portion of the packaging machine, the apparatus including a frame, the support plate being secured to the frame; and
   at least one roller for exerting a pressure on the web of film against the support plate, the roller being coupled to means for adjustably orienting the roller relative to a direction of movement of the film, the means for adjustably orienting being coupled to the frame.

11. The apparatus of claim 10 including two rollers, one roller being located on each of a side of the support plate.

12. The apparatus of claim 10 including means for limiting the means for orienting.

13. The apparatus of claim 10 wherein the roller is mounted on a shaft of rotation parallel to the support plate.

14. The apparatus of claim 13 wherein the roller is mounted on a roller support movable in a direction perpendicular to the support plate, and the roller support is biased back to the support plate by elastic means.

15. An apparatus for guiding a folded web of film that is fed past the apparatus for guiding comprising:
 a frame;
 a support plate, extending from the frame, the support plate being received between folded sides of the web of film as the film is fed past the apparatus;
 two pressure means extending from opposite ends of the frame, for urging opposite sides of the film against the support plate; and
 means for orienting the pressure means coupled to the pressure means.

16. The apparatus of claim 15 wherein the pressure means are coupled to means for limiting the orientation of the pressure means.

17. The apparatus of claim 15 wherein each pressure means includes a roller.

18. The apparatus of claim 17 wherein each pressure means includes a spring for urging the roller toward the support plate.

19. The apparatus of claim 15 including a lug that extends in a direction transverse to the support plate.

* * * * *

UNITED STATES PATENT AND TRADEMARK OFFICE
CERTIFICATE OF CORRECTION

PATENT NO. : 4,909,425

DATED : March 20, 1990

INVENTOR(S) : Etienne Susini and Pierre Soubrier

It is certified that error appears in the above-identified patent and that said Letters Patent is hereby corrected as shown below:

In the title page, the Assignee [73] should additionally include --Prepac, Villejuif, France--

Signed and Sealed this

Thirtieth Day of April, 1991

Attest:

HARRY F. MANBECK, JR.

Attesting Officer

Commissioner of Patents and Trademarks